(12) United States Patent
Gögel et al.

(10) Patent No.: US 12,668,433 B2
(45) Date of Patent: Jun. 30, 2026

(54) CONVEYING FACILITY FOR CONVEYING CELL STACKS FORMED BY SEGMENTS FOR THE ENERGY CELL-PRODUCING INDUSTRY, CORRESPONDING CELL STACK PRODUCTION SYSTEM, AND METHOD FOR PROVIDING CELL STACKS OF THIS KIND

(71) Applicant: KÖRBER TECHNOLOGIES GMBH, Hamburg (DE)

(72) Inventors: Patrick Gögel, Hamburg (DE); Jan Kreysern, Hamburg (DE); Marcus Wagner, Hamburg (DE); Michael Kleine Wächter, Lankau (DE); Karsten Meinke, Mölln (DE); Nils Hofmann, Ottersberg (DE); Manfred Folger, Hamburg (DE)

(73) Assignee: KÖRBER TECHNOLOGIES GMBH, Hamburg (DE)

( * ) Notice: Subject to any disclaimer, the term of this patent is extended or adjusted under 35 U.S.C. 154(b) by 116 days.

(21) Appl. No.: 18/694,834

(22) PCT Filed: Sep. 28, 2022

(86) PCT No.: PCT/EP2022/076993
§ 371 (c)(1),
(2) Date: Mar. 22, 2024

(87) PCT Pub. No.: WO2023/052430
PCT Pub. Date: Apr. 6, 2023

(65) Prior Publication Data
US 2025/0002261 A1 Jan. 2, 2025

(30) Foreign Application Priority Data
Oct. 1, 2021 (DE) .................... 10 2021 211 070.3

(51) Int. Cl.
B65G 54/02 (2006.01)
B65G 43/10 (2006.01)
H01M 10/04 (2006.01)

(52) U.S. Cl.
CPC ............. *B65G 43/10* (2013.01); *B65G 54/02* (2013.01); *H01M 10/0404* (2013.01)

(58) Field of Classification Search
CPC .... B65G 43/10; B65G 54/02; H01M 10/0404
(Continued)

(56) References Cited

U.S. PATENT DOCUMENTS 5,025,551 A * 6/1991 Rose .................... H01M 10/14
29/730
2002/0007552 A1 1/2002 Singleton et al.
(Continued)

FOREIGN PATENT DOCUMENTS

DE 10 2017 216 213 A1 3/2019
EP 3835242 A1 6/2021
(Continued)

OTHER PUBLICATIONS

CN120019013 (Year: 2023).*

*Primary Examiner* — Gene O Crawford
*Assistant Examiner* — Lester Rushin, III
(74) *Attorney, Agent, or Firm* — SALIWANCHIK, LLOYD & EISENSCHENK

(57) ABSTRACT

Conveying facility for conveying cell stacks formed by segments for the energy cell-producing industry, comprising several transport vehicles which can be moved individually and are each equipped to transport a cell stack, wherein a pick-up region is provided which has at least two transfer stations at which the cell stacks are provided to be picked up by the transport vehicles or at which the segments are stacked onto the transport vehicles to form cell stacks, (Continued)

wherein each transfer station comprises its own cell stacking apparatus which is equipped to combine the segments into cell stacks having a pre-defined cell stack height; a delivery region which is spatially distanced from the pick-up region is provided, in which delivery region the cell stack received in the pick-up region is removed from the transport vehicle; and a control device is provided which is equipped to individually control and/or regulate the movement speed and/or the movement route of the transport vehicles loaded with the cell stacks between the pick-up region and the delivery region.

15 Claims, 4 Drawing Sheets

(58) Field of Classification Search
USPC ........................................................ 198/619
See application file for complete search history.

(56) References Cited

U.S. PATENT DOCUMENTS

2013/0111739 A1    5/2013  Wu et al.
2020/0044273 A1*   2/2020  Abe .................. H01M 10/0468

FOREIGN PATENT DOCUMENTS

WO    WO 2016/041713 A1    3/2016
WO    WO 2019/048589 A1    3/2019

* cited by examiner

300

CONVEYING FACILITY FOR CONVEYING CELL STACKS FORMED BY SEGMENTS FOR THE ENERGY CELL-PRODUCING INDUSTRY, CORRESPONDING CELL STACK PRODUCTION SYSTEM, AND METHOD FOR PROVIDING CELL STACKS OF THIS KIND

CROSS REFERENCE TO RELATED APPLICATIONS

This application is a National Stage Application of International Application Number PCT/EP2022/076993, filed Sep. 28, 2022; which claims priority to German Patent Application No. 10 2021 211 070.3, filed Oct. 1, 2021.

FIELD OF THE INVENTION

The present invention relates to a conveying facility for conveying cell stacks (115) formed by segments (116) for the energy cell-producing industry, comprising several transport vehicles (2) which can be moved individually and are each equipped to transport a cell stack (115), to a cell stack production system for producing cell stacks (115) formed by segments (116) for the energy cell-producing industry and to a method for providing cell stacks (115) formed by segments (116) for the energy cell-producing industry.

BACKGROUND OF THE INVENTION

Energy cells or energy storage devices in the context of the invention are used, for example, in motor vehicles, other land vehicles, ships, aeroplanes, or in stationary systems, e.g., photovoltaic systems in the form of battery cells or fuel cells, in which very large quantities of energy have to be stored over relatively long periods of time. For this purpose, such energy cells have a structure formed of a plurality of segments stacked to form a stack. These segments are respectively alternating anode sheets and cathode sheets, which are separated from one another by separator sheets also produced as segments. The segments are precut in the production process, and are then placed one on top of the other in the pre-determined sequence to form the stacks, and are connected to one another by lamination. The anode sheets and the cathode sheets are firstly cut from a continuous web, and are then individually placed, respectively spaced apart on one continuous web of a separator material. This "double-layered" continuous web which is then formed from the separator material having the anode sheets and cathode sheets placed on top is then cut into segments, again with a cutting device, in a second step, wherein, in this case, the segments are formed in double layers by a separator sheet having an anode sheet or cathode sheet arranged on top. If this can be done or is required from a production point of view, the continuous webs of the separator material having the anode sheets and cathode sheets placed on top can also be placed on top of each other before they are cut, such that a continuous web is formed, having a first continuous layer of the separator material having anode sheets or cathode sheets placed on top, and a second continuous layer of the separator material, having anode sheets or cathode sheets placed on top in turn. This "four-layered" continuous web is then cut into segments by means of a cutting device, these segments being formed in this case in four layers, having a first separator sheet, an anode sheet, a second separator sheet and a cathode sheet placed on top of the latter. The advantage of this solution is that a cut can be saved. Segments in the context of this invention are accordingly single-layered segments of a separator material, anode material or cathode material, double-layered or four-layered segments of the structure described above.

Devices for producing battery cells are for example known from WO 2016/041713 A1 and from DE 10 2017 216 213 A1.

A device for producing an electrode stack is further known from WO 2019/048589 A1. For this purpose, a transport system having carriages is provided, on which carriages electrode and separator layers can be stacked. Stacking stations, on which only separator layers are placed, stacking stations on which only cathodes are placed, and stacking stations, on which only anode layers are placed exist. A cell stack can thus be layered in the desired sequence on the placement surface of the carriage via corresponding movement of the carriage to the stacking stations.

A device for producing a battery cell is also known from US 2002/0007552 A1. After producing a battery cell, it is transferred to a conveyor belt by means of the so-called "pick and place" principle.

The production of battery cells, for example for electro-mobility, is implemented today in production facilities capable of producing 100 to 240 mono cells per minute. These machines work in partial regions or continuously with cycled, discontinuous movements, for instance movements back and forth, and are thus limited with regard to their production output. A majority of the known machines work in single-sheet stacking methods (e.g., pick and place), having the disadvantage of a slower processing. It is not possible to laminate cell formations here.

A further known approach is a machine having continuously running material webs and cycled tools, e.g., separating knives, tools for changing pitch.

In principle, machines having cycled movements are limited in power. The parts affected by mass, e.g., receptacles and tools, must be permanently accelerated and braked. The processes determine the temporal course, and a lot of energy is used in the process. The mass of the moved parts cannot be reduced at random. Parts which are moved more quickly must often bear higher loads, and thus become heavier and more complex.

In order to reduce the production costs of battery production, the production output of the machines must be increased, among other things. A condition for the high production output is a high manufacture rate of the stacks of the energy cells, which are formed from several segments of the kind described in the introduction stacked on top of each other.

In an upstream production step, and so in a first step, the segments are stacked one on top of the other to form the so-called mono cells, consisting of a first separator sheet, an anode sheet arranged thereon, a second separator sheet arranged thereon and a cathode sheet arranged thereon. As an alternative, the separator sheets can first be fed as two continuous webs, wherein the segments already cut in the form of the anode sheets are placed on one of the continuous webs, and the segments already cut in the form of cathode sheets are placed on the other continuous web, and are connected to one another by a lamination process. The composite webs which are thus prefabricated are then connected to one another in a further lamination process, in order then to form a four-layered composite web.

In principle, it is also conceivable to place the first cut electrode in the form of the cathode or anode between the separator sheets in the form of the continuous webs, and to place the second cut electrode in the form of the anode or cathode on or below one of the separator sheets. The lamination of the four-layered web is then implemented in a joint lamination process, such that the mono cell is produced in a fixed formation even while the continuous webs still exist, and thus before cutting.

Regardless of whether the mono cells are produced with a one or two-step lamination process, the mono cells are then cut from the composite web by a cut through the spaces between the anode sheets or cathode sheets following one after the other.

As an alternative, the continuous webs can also first be cut out of the separator material having the anode sheets and cathode sheets arranged thereon, whereby the mono cells are then produced by a downstream composite process respectively from a first cut separator sheet having an anode having a second cut separator sheet having a cathode.

The segments are then stacked one on top of the other to form a stack of a plurality of segments. If the segments are mono cells or separator sheets having anode or cathode sheets arranged thereon, a cathode or anode is located on a free side surface of the stack, which is then covered by an arrangement of a so-called closing cell. The closing cell comprises a first separator sheet, an anode or cathode sheet arranged thereon and a second separator sheet arranged thereon, on which, however, no cathode or anode sheet is arranged. The closing cell can thus also be regarded as a mono cell without a cathode or anode sheet. The finished stack formed from the plurality of mono cells and the closing cell is then characterised in that it respectively has one separator sheet on its top side and on its underside, and the anode sheets and cathode sheets are respectively covered on the top side and on the underside by separator sheets, and are not in contact with each other.

When forming cell stacks, however, delays can arise for different reasons. No solutions are known from the prior art, however, for how these temporal delays can be avoided without negatively impairing production output.

BRIEF SUMMARY OF THE INVENTION

In this context, the object of the invention is to provide an improved conveying facility, which makes it possible to provide cell stacks more reliably, and to provide a correspondingly improved cell stack production system and a corresponding method.

The object is solved by the features of the independent claims. Further preferred embodiments of the invention can be gathered from the sub-claims, the figures and the associated description.

DETAILED DESCRIPTION

According to a first aspect of the invention, a conveying facility for conveying cell stacks formed by segments for the energy cell-producing industry is proposed, said conveying facility comprising several transport vehicles which can be moved individually and are each equipped to transport a cell stack, wherein a pick-up region having at least two transfer stations is provided at which the cell stacks are provided for pick-up by the transport vehicles or at which the segments are stacked on the transport vehicles to form cell stacks, wherein each transfer station comprises its own cell stacking apparatus, which is equipped to combine the segments to form cell stacks having a pre-defined cell stack height; a delivery region which is spatially distanced from the pick-up region is provided, in which the cell stack received in the pick-up region is removed from the transport vehicle; and a control device is provided, which is equipped to individually control and/or regulate the movement speed and/or the movement route of the transport vehicles loaded with the cell stacks between the pick-up region and the delivery region.

The individual control or regulation of the movement, and thus the movement speed and/or the movement route, of the transport vehicles means that the arrival time of each individual transport vehicle in the delivery region can be influenced. By reducing the movement speed, the arrival time in the delivery region can be delayed; by increasing the movement speed, an earlier arrival time can be brought about. If there is a possibility of changing the movement route, the arrival time can be delayed by lengthening the movement route; when shortening the movement route, an earlier arrival time can be achieved. The temporal sequence of the transport vehicles arriving in the delivery region can thus be adjusted such that it is ideally coordinated with the following process. Unpredictable impairments to the production process can thus furthermore be compensated for, such that system reliability as a whole is increased when producing cell stacks.

The control unit provided to control or regulate the movement can, for example, be a centralised control unit. For example, however, it can also be a decentralised control unit, of which the components are for example assigned to the individual transport vehicles. Further, for example, the control unit can be a combination of centralised and decentralised components.

By individually controlling or regulating the movement, the acceleration of the transport vehicles can furthermore be selected such that the cell stack remains in the desired shape, i.e., the individual layers of segments do not slide against each other. Furthermore, the maximum speed on bends can also be limited. For this purpose, a dataset having values for maximum accelerations, for position-dependent maximum speed and/or for further limit values with regard to the movement of the transport vehicles is preferably stored on the control unit. The proposed conveying facility thus also makes it possible to transport the cell stacks in a manner which protects the products. Furthermore, the unloaded transport vehicles can then be returned without observing these maximum values.

The segments which are stacked by the cell stacking apparatuses are preferably mono cells.

The transfer stations are preferably equipped such that the transport vehicles can be positioned below the cell stack to be transferred for the transfer of the cell stacks or of the segments. The finished cell stacks or—when forming the cell stack on the transport vehicle—the segments can be placed in a gravity-assisted manner on a placement surface of the transport vehicle. At least two transfer stations are provided, wherein the number of required transfer stations is substantially determined by the desired production speed. It has proved to be the case, for example, that a suitable production speed can be achieved with exactly four transfer stations.

The conveying facility can preferably comprise an unloading device for removing the cell stack in the pick-up region, said unloading device being equipped to remove the cell stack from the transport vehicle and to transfer it to a downstream system or to a storage facility.

It is further proposed to control and/or to regulate the movement route and/or the movement speed such that a delayed completion of the cell stack at one of the transfer stations is compensated for in a compensation region between the pick-up region and the delivery region. In this context, a compensation is understood to mean that potential gaps, which arise via a delayed completion of the cell stack in the pick-up region, are reduced as far as possible; this need not necessarily mean that the gaps are completely closed. The cell stack is then completed if it has reached the pre-determined cell stack height. The completion can either take place before the transfer to the transport vehicle or on the transport vehicle itself.

It is further proposed that the control device is equipped to control and/or to regulate the movement speed and/or the movement route such that the transport vehicles loaded with the cell stacks are provided in a pre-determined production cycle in the delivery region. Ideally, it is possible to compensate to the extent that the transport vehicles arrive in the delivery region at a pre-determined frequency and at a constant spatial distance. The control unit can preferably also change the frequency of the arriving transport vehicles for a pre-defined period of time. An adjustment to a changing production cycle of downstream and/or upstream processes can thus be undertaken.

It is further proposed that the control device is equipped to control and/or to regulate the transport vehicles such that they are conveyed at a constant speed in the delivery region or are moved in a defined delivery cycle, preferably also at an equidistant spacing from one another. In this way, the downstream process steps, for example the removal of the cell stack in the delivery region can be undertaken at a constant rate. The complexity and the control effort of the downstream facilities can thus be reduced.

It is further proposed that a waiting region is provided, in which at least a subset of the transport vehicles is positioned in an unloaded state. In the context of this invention, an unloaded or empty transport vehicle is a transport vehicle which is not loaded with a cell stack or segment. Via the transport vehicles positioned in the waiting region, it can be ensured that a transport vehicle can always be provided to pick up the cell stack in the pick-up region. The emergence of temporal delays due to an unavailable transport vehicle can thus be avoided.

The control device is preferably equipped to move the transport vehicles individually from the waiting region into the pick-up region as soon as a segment or a cell stack is ready at one of the transfer stations or a provision is announced. A transport vehicle can thus be provided with as little delay as possible. The temporal loss between completion of the cell stack by the cell stacking apparatus can thus be reduced to a minimum, and efficiency can thus be increased.

It is further proposed that the conveying facility comprises at least one pre-defined transport path, via which the transport vehicles can be moved between the pick-up region and the delivery region. By using at least one pre-defined transport path, the control or regulation can be simplified, because the distance of the pre-defined paths is known, and is preferably stored on a data storage device of the control unit.

It is further proposed that the at least one transport path is defined by a rail system, on which the transport vehicles can be moved. The rail system makes it possible to move the transport vehicles along the rail system, such that a movement control of the transport vehicles is not required. The rail system further offers the advantage that the transport vehicles can be very precisely individually moved; a positioning is possible up to a few tenths of a millimetre. The rail system can naturally also have branches, which can be reached via controllable switches.

As an alternative to the use of a rail system, the at least one transport path can for example be defined by a movement surface on which the transport vehicles can be moved. The movement surface is preferably a component of a planar drive system, by means of which the transport vehicles can in principle be moved in any direction on the movement surface; this is achieved by means of magnetic force, and thus for example via a linear motor, such that the transport vehicles float over the movement surface. The distance between the transport vehicle and the plane can also be adjusted to a few millimetres. This planar drive system is naturally also a component of the conveying facility. By using the movement surface, a greater flexibility with regard to the possible movement routes can be achieved in principle. The planar drive system can for example be formed by standardised components, for example in the form of tiles, which contain the corresponding magnet technology and are connected to the control device. As an alternative, when using the movement surface, the transport vehicles can be equipped with a steering device which can be controlled by the control device and/or their own drive unit, for example in the form of an electric motor.

Naturally, hybrid solutions are also possible in principle, in which the rail system is combined with a movement surface. However, it would also be possible to combine completely different transport concepts, for example in the form of conveyor belts, for example. Thus, for example, the rail system can be combined with a conveyor belt system.

It is further proposed that the at least one transport path comprises at least one bypass path, via which each of the transfer stations can be reached by the transport vehicle regardless of an occupancy of a remaining transfer station by another transport vehicle and/or can be left in the direction of the delivery region. The possibility is thus created of providing the transport vehicle as required at the corresponding transfer station without delays arising due to the occupancy of the remaining transfer stations with other transport vehicles. In this embodiment, use is preferably made of stacking the segments directly on the transport vehicle to form cell stacks of a pre-defined height. Additional devices for forming the cell stack before the transfer to the transport vehicle, for example in the form of a magazine drum, are thus not required.

It is further proposed that a processing unit for processing the cell stack is provided between the pick-up region and the delivery region or within the delivery region, whereby the cell stacks are fed to the processing device by the transport vehicle. The processing unit is preferably equipped to add further material layers. For example, it can thus be achieved that the cell stacks begin and end with the same sequence of layer types, for example with a separator on the outer end followed by an anode on the inner side of the separator. The processing unit can for example be arranged in the compensation region. The control device is preferably then equipped to also compensate for potential delays which can result when processing the cell stack. As an alternative, the processing unit can also be arranged in the delivery region. This is advantageous because the compensation has already taken place there, such that the processing unit can also work in the production cycle set by the control device.

According to a second aspect of the invention, a cell stack production system is proposed for producing cell stacks formed by segments for the energy cell-producing industry, said cell stack production system comprising a conveying facility according to one of claims 1 to 11 and a feeding facility, wherein a feeding device is provided as a component of the feeding facility, which feeding device feeds the segments such that they can be placed one on top of the other by the cell stacking apparatuses of the conveying facility to form the cell stacks. The segments of the conveying facility are fed by the feeding device, which can for example be implemented with the interposition of further components, for example transfer and/or guide rollers. With regard to the technical effects and advantages connected to the cell stack production system, reference is made to the preceding embodiments in connection with the conveying facility.

It is further proposed that the feeding facility comprises at least one rejection device with which faulty segments can be removed from the production process. The rejection device preferably comprises checking devices, which are equipped to recognise damaged segments, and an ejection drum, by means of which the damaged segments can be moved away into a rejection reservoir. It can be ensured by the at least one rejection device that only flawless segments are used to form the cell stack. Because the segments are distributed to several, for example to four, transfer stations, respectively having one cell stacking apparatus, a delay in completing the cell stack arises in the cell stack where the segment is missing because individual segments are sorted out by the rejection device. The pre-defined cell stack height is thus only reached in the respective cell stacking apparatus later, which leads to an irregular delivery of the cell stack to the transport vehicles or a delayed completion of the cell stack on the transport vehicle in the pick-up region. The possibility of individually controlling or regulating the transport vehicles via the control unit makes it possible, however, to compensate for this irregularity, such that the cell stacks can be provided in the delivery region in a pre-determined production cycle. In summary, the production quality can thus be increased without negatively impairing the production cycle.

According to a third aspect of the invention, a method for providing cell stacks formed by segments for the energy cell-producing industry is proposed, which comprises the following method steps: a) providing cell stacks having a pre-defined cell stack height at several transfer stations in a pick-up region, wherein segments are combined to form cell stacks having a pre-defined cell stack height at each of the transfer stations; and b) transporting the cell stack from the pick-up region to a delivery region, which is spatially distanced from the pick-up region, by means of a plurality of transport vehicles, which are each equipped to transport a cell stack, wherein the movement speed and/or the movement route of the transport vehicles loaded with the cell stacks between the pick-up region and the delivery region is controlled and/or regulated individually.

In step a), the cell stack can be provided for the transport vehicles, or the cell stack can be completed on the transport vehicles in an irregular cycle. By controlling or regulating the movement speed and/or the movement route, the cell stacks can still be provided in the delivery region in a regular intended cycle.

It has proved advantageous to carry out the method by means of a conveying facility according to one of claims 1 to 11 or by means of a cell stack production system according to one of claim 12 or 13.

The invention is explained in the following with reference to preferred embodiments with reference to the included figures.

BRIEF DESCRIPTION OF THE FIGURES

In FIG. 1, a cell stack production system 200 comprising a feeding facility 100 and a conveying facility 1 is depicted.

Figure 1:
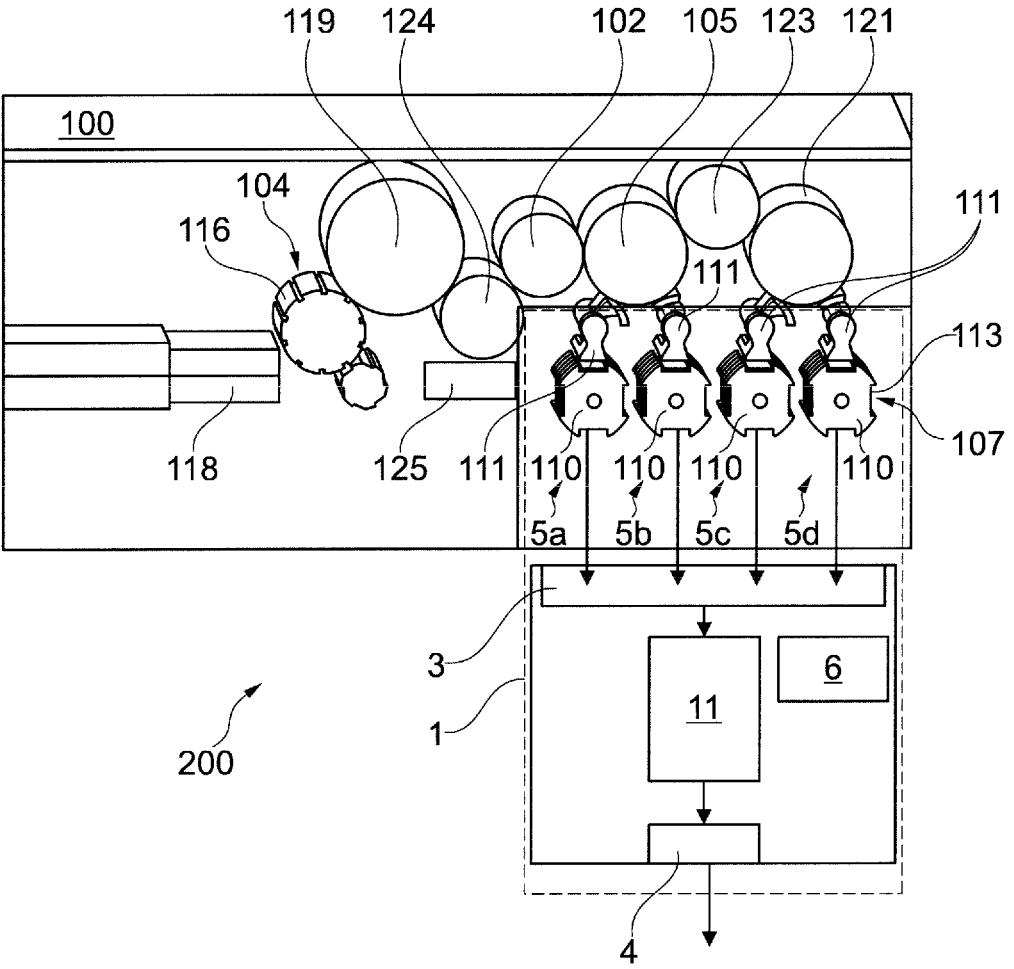
FIG. 1: shows a cell stack production system comprising a feeding facility and a conveying facility.

The feeding facility 100 comprises a feeding device 102, an upstream cutting device 104 and a cell stacking device 107 which is arranged between the feeding device 102 and a pick-up region 3 of the conveying facility 1, said cell stacking device also being assigned to the conveying facility 1.

A continuous web (not depicted) is fed to the feeding facility 100, said continuous web being formed from two continuous webs of a separator material having anode sheets arranged between them and spaced apart in the longitudinal direction of the continuous web, and cathode sheets which are placed on one side of one of the continuous webs of the separator material and are also spaced apart in the longitudinal direction of the continuous web. However, the continuous web can also be formed from only one continuous web of a separator material with or without electrode sheets placed on it. If the continuous web has spaced-apart electrode sheets, then the cut in the cutting device 104 is respectively made through the separating points between the electrode sheets.

The cutting device 104 is formed here by a drum pair consisting of a cutting drum having cutting blades and a counter drum having counter blades, and cuts the continuous web fed onto the cutting drum or the counter drum-by shearing the cutting blades on the counter blades-into segments 116 of a pre-determined length, which is defined by the distances of the cutting blades or of the counter blades, depending on whether the continuous web is fed onto the cutting drum or the counter drum. Starting from the cutting device 104, the cut segments 116 are fed to the feeding device 102. In this exemplary embodiment, the feeding device 102 comprises a transport drum, on which the segments 116 are held, for example by negative pressure, until they are finally transferred to a first transfer drum 105. If the fed continuous web is a four-layered web, the segments 116 cut from it correspond to the mono cells described in the introduction.

Two checking devices 118 and 119 are further provided, which are equipped to recognise damaged segments 116. The damaged segments 116 are then removed between the cutting device 104 and the feeding device 102 via an ejection drum 124 into a rejection reservoir 125. The checking devices 118 and 119 together with the ejection drum 124 and the rejection reservoir 125 form a rejection device.

Naturally, the feeding facility 100 can comprise further components or groups of components which are not depicted in FIG. 1. These include, for example, devices for aligning intermediate products, for example a device for regulating web edges after the lamination of the mono cells, which device is arranged after the checking device 118.

The cell stacking device 107 comprises four removal devices 111 in the form of removal stamps driven to rotational movement. Two of the removal devices 111 are assigned to the first transfer drum 105 and remove segments 116 from the first transfer drum 105 during their orbital movement, and then transfer these segments 116 respectively to a following magazine drum 110 explained in more detail in the following. The orbital movement of the removal stamps is controlled such that they take the segments 116 from the first transfer drum 105 in a pre-determined order. In the present exemplary embodiment, four removal devices 111 are provided, such that each of the removal devices 111 takes the segments 116 from the first transfer drum 105 or a second transfer drum 121 in a fixed order in a four rhythm. Thus, in an orbit, the removal devices 111 assigned to the first transfer drum 105 together take two segments 116 from the periphery of the first transfer drum 105. The rotations of the removal devices 111 are coordinated with the rotation of the first transfer drum 105 such that when the first transfer drum 105 is fully occupied, they take half of the segments 116 held on the first transfer drum 105 overall. The segments 116 remaining on the first transfer drum 105 are then taken by a diversion drum 123, and are transferred to the second transfer drum 121. The segments 116 are reversed twice in their alignment in relation to their surfaces when they are taken by the diversion drum 123 and when they are transferred from the diversion drum 123 to the second transfer drum 121, such that the segments 116 are then arranged on the second transfer drum 121 in an alignment identical to the alignment on the first transfer drum 105. Two removal devices 111 in the form of orbiting removal stamps are also provided on the second transfer drum 121, said removal devices taking the remaining half of the segments 116 from the second transfer drum 121, and respectively feeding them to a magazine drum 110 according to the same principle.

A first subset of the segments 116 is thus taken from the first transfer drum 105 by the first two removal devices 111, while the second subset of segments 116 remaining on the first transfer drum 105 is transferred from the diversion drum 123 to the second transfer drum 121 while being turned twice, and are removed from the second transfer drum by the last two removal devices 111. The segments 116 are thus fed by the feeding device 102 in a continuous flow, and are removed from the latter in a consecutive transfer for parallel stacking in the cell stacking device 107.

For this purpose, the segments 116 are delivered by the four removal devices 111 into four magazine drums 110 of the cell stacking device 107 arranged in parallel, in which the segments 116 are placed on top of each other to form four stacks, and are further delivered to the conveying facility 1. In this embodiment, the magazine drum 110 has four magazines 113 arranged on its external periphery, said magazines 113 being open towards the outside; the magazine drums 110 are respectively a component of a cell stacking apparatus 108; see FIG. 2.

Figure 2:
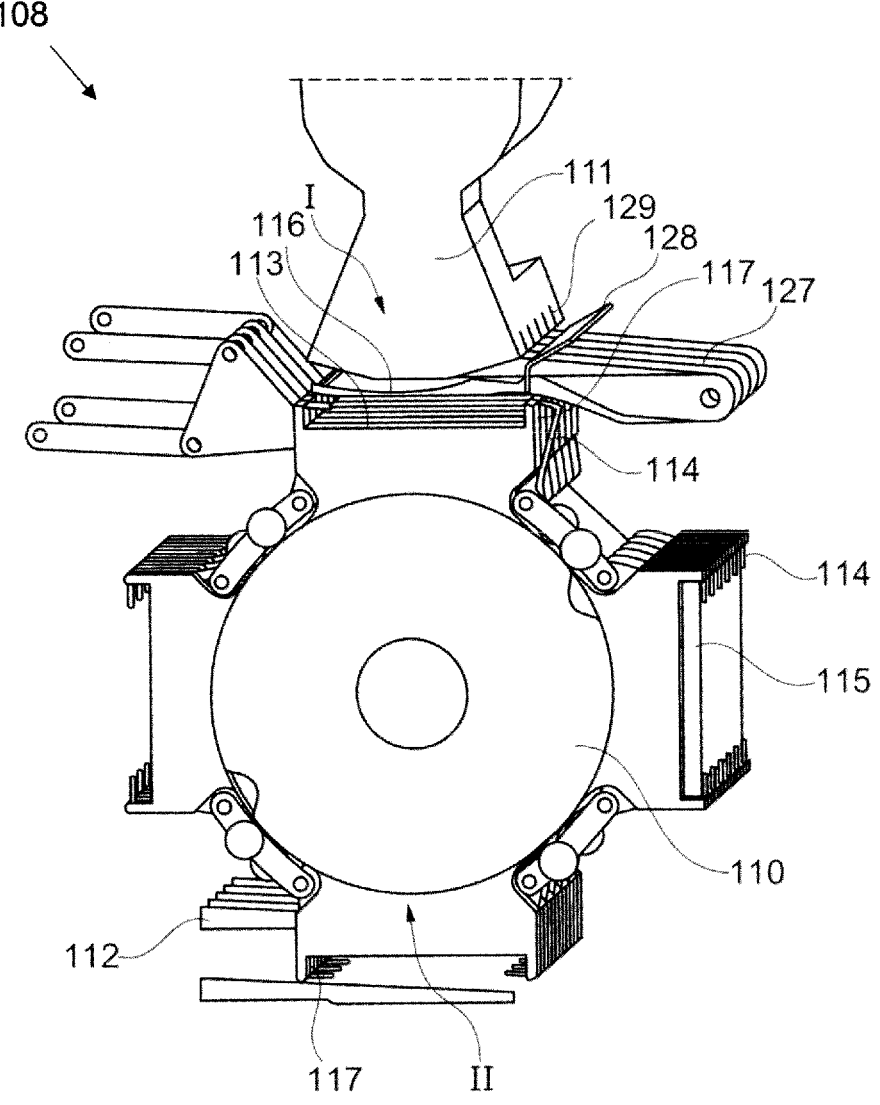
FIG. 2: shows a cell stacking apparatus.

FIG. 1 also shows four transfer stations 5a, 5b, 5c and 5d, which respectively comprise one magazine drum 110 of the cell stacking apparatus 108; see also FIG. 2. Further significant components of the conveying facility 1 are also schematically represented in FIG. 1. The transfer stations 5a, 5b, 5c and 5d deliver the cell stack 115 to transport vehicles 2 in the pick-up region 3 (see FIGS. 3 and 4), the movement speed and/or movement route of which transport vehicles can be individually controlled and/or regulated by a control device 6 in a compensation region 11, such that potential gaps between the transport vehicles 2 can be compensated for. The cell stacks 115 transported by the transport vehicles 2 can then be unloaded again in a delivery region 4. A detailed explanation of the conveying facility 1 follows with reference to FIGS. 3 and 4.

The segments 116 sorted out by means of the ejection drum 124 are not removed by the removal devices 111 from the two transfer drums 105 and 121, however, meaning that the sorted-out segments 116 do not contribute to forming the cell stack 115. Consequently, the cell stacks 115 cannot always be formed homogeneously or without gaps. In other words, the four cell stacks 115 which are simultaneously located in the cell stacking device 107 do not necessarily reach a pre-defined number of segments 116 which is required to form a complete cell stack 115 at the same time in practice.

In this exemplary embodiment, the cell stacking device 107 correspondingly comprises four cell stacking apparatuses 108, the core components of which are respectively formed by the removal device 111, the magazine drum 110 and a delivery device 112, wherein one of the cell stacking apparatuses 108 is depicted (enlarged) in FIG. 2. In principle, however, cell stacking devices 107 having two, three or more than four cell stacking apparatuses 108 are possible, depending on the desired production speed.

FIG. 2 shows one of the cell stacking apparatuses 108 in an exemplary form, which is used as a component of the conveying facility 1, see FIG. 1. The removal device 111 of the cell stacking apparatus 108 is formed by a removal stamp driven to rotational movement, which respectively removes one segment 116 from one of the two transfer drums 105 or 121 (see FIG. 1) during each orbit, and moves said segment into a takeover point I of the magazine drum 110. In this exemplary embodiment, the magazine drum 110 has four magazines 113 arranged on its external periphery, which are open towards the outside. In principle, however, magazine drums 110 having two opposite magazines 113 are also conceivable. A transfer device which is stationary in relation to the magazine drum 110, and is fixed in its position in relation to the takeover point I, said transfer device being in the form of a comb-like transfer part 127 having a plurality of bars arranged in parallel with one another, is further provided, said transfer part engaging with the bars through corresponding slits of a wall 128 which is likewise fixed. The removal stamp further has slits 129 which are arranged in parallel with one another and are aligned in the peripheral direction of the orbit of the removal stamp, into which slits 129 the transfer part 127 penetrates during the orbit of the removal stamp with its stripping bars.

The segments 116 are transferred from the removal stamp to the respective magazine 114 of the magazine drum 110 at a standstill. For this purpose, when the segment 116 is transferred to the removal device 111, the removal stamp is rotated at the same orbital speed as the respective transfer drum 105 or 121, from which the segment 115 is taken. The removal device 111 is delayed after a segment 115 is received until standstill at the transfer point I. By means of the transfer part 127, the segment 115 is then transferred at a standstill from the removal stamp to the magazine 113. For this purpose, a vacuum is switched on on the transfer part 127.

In the present exemplary embodiment, because the takeover point I is arranged on the top side of the magazine drum 110, and the segments are introduced into the magazine 113 from above, the introduction movement of the segments 116 into the magazine 113 is additionally supported in this case by the effect of gravity.

The magazine 113 further has comb-like side walls having engagement openings 117 flush in the peripheral direction and a holding device 114 in the form of several engagement fingers which can be pivoted by means of a pivot mechanism. The movement of the holding device 114, and thus of the pivotable engagement fingers, is controlled by means of a mechanical or electronic controller, such that the engagement fingers of the holding device 114 do not engage through the engagement openings 117 at the takeover point I, and thus release the opening of the magazine 113 towards the outside. The opening of the magazine 113 is thus freely accessible at the takeover point I, and the segments 116 can be stacked therein via a repeating orbit of the removal stamp to form a cell stack 115 with a pre-defined cell stack height.

When the pre-determined cell stack height is reached in the magazine 113, the magazine drum 110 is rotated by 90 degrees, and the next magazine 113 is moved to the takeover point I to repeat the stacking process. Simultaneously, when the rotation of the magazine drum 110 begins, the holding device 114 is moved by the controller such that it engages with the engagement fingers through the engagement openings 117 of the side walls of the magazine 113, and comes to rest on the top side of the stack 115. Thus, the holding device 114 then secures the cell stack 115 against an undesirable exit from the magazine 113.

In the following cycle of the rotation of the magazine drum 110, the magazine 113 filled with the cell stack 115 reaches the lower transfer point II in the depiction. At the transfer point II, a delivery device arranged stationarily is provided, with which the cell stacks 115 are removed from the magazine 114 at a standstill. The delivery device comprises an upper part 112 and a lower part (not depicted). The cell stack 115 is gripped by the upper part 112 and by the lower part such that it is clamped between them. So that the upper part 112 can engage in the magazine 113 on the top side of the cell stack 115, it comprises several bars aligned in parallel with one another and flush with the engagement openings 117, which bars reach the height of the base of the magazine 113 during the rotation of the magazine drum 110 in order to engage in the engagement openings 117.

In order to move the cell stack 115 out, the holding device 114 has been released in a preceding step. This can for example be implemented by the delivery device operating the holding device 114 before or simultaneously with the introduction movement of its bars into the engagement opening 117, and moving the holding device into a release position in which the holding device 114 releases the opening of the magazine 113 and the stack 115 can be removed from the magazine 113.

The upper part 112 and the lower part (not depicted) are then lowered with the cell stack 115 clamped between them in the direction of the corresponding transport vehicle 2, such that the cell stack 115 can be transferred to the transport vehicle 2 in the fixed state. Analogously to the upper part 112, the lower part (not depicted) also comprises several bars which are arranged in parallel with one another and flush with the openings of the transport vehicles, and which engage in the openings of the transport vehicles during the lowering movement of the delivery device.

The delivery device is opened, and thus the clamping force acting on the cell stack 115 via the upper part 112 and the lower part (not depicted) is released in a targeted manner at the transfer point II. In this manner, the cell stack 115 can be fixed until it is transferred to the transport system, in order not to impair the formation of the segments 116 forming the cell stack 115.

By using several stacking apparatuses 108, in this exemplary embodiment exactly four, the segments 116 continuously fed through the feeding facility 100 are distributed to several cell stacks 115, here exactly four, see also FIG. 1. Due to this parallelisation, the segments 116 can be received at a high web speed, and their speed can be protectively reduced until the segments 116 are delivered at a standstill to the magazine 113 of the magazine drums 110. The core function of the removal device 111 is thus to continuously receive and cyclically deliver segments 116.

Because the complete cell stacks 115 cannot be provided simultaneously by the four cell stacking apparatuses 108 at the respective transfer point II due to the segments 116 removed by means of the ejection drum 124, this effect is compensated for by the conveying facility 1 depicted in more detail in the following.

Figure 3:
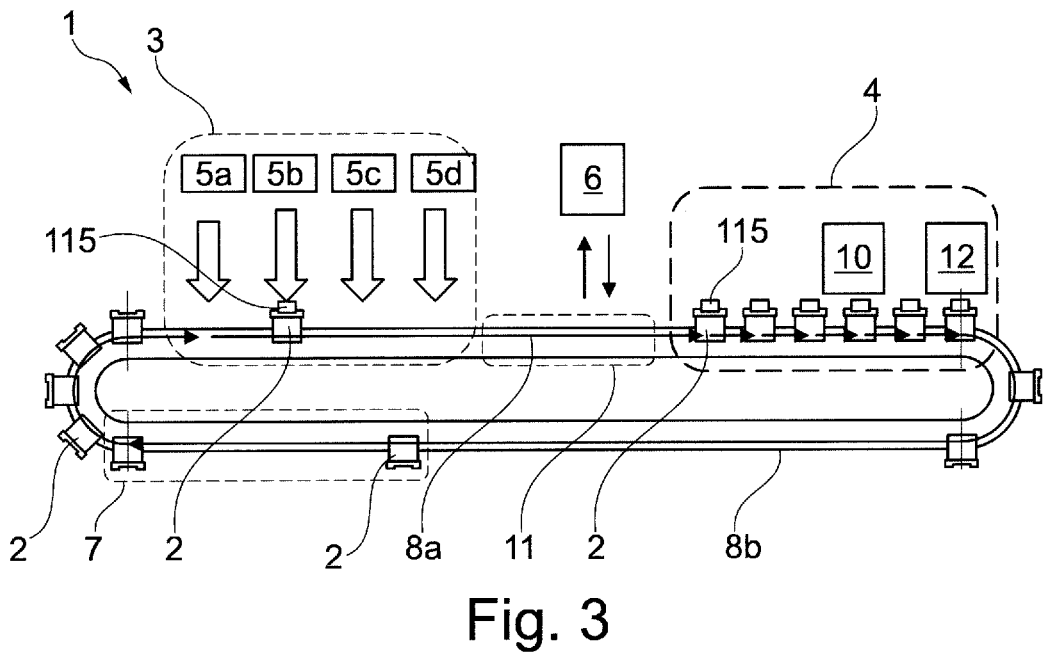
FIG. 3: shows a conveying facility according to a first embodiment.

FIG. 3 shows a conveying facility 1 having the four transfer stations 5a, 5b, 5c and 5d, which respectively comprise one of the cell stacking apparatuses 108 (see FIG. 2) and which position the latter such that the cell stacks 115 can be transferred to the transport vehicles 2. The transport vehicles 2 are moved on a rail system that defines transport paths 8a, 8b.

The drive of the transport vehicles 2 is implemented in this case by stationary motor modules (not depicted), which are arranged along the rail system. As an alternative, the transport vehicles 2 can also respectively have their own drive, for example in the form of an electric motor.

The conveying facility 1 depicted in FIG. 3 shows two empty transport vehicles 2, and thus transport vehicles 2 which are not loaded with cell stacks 115, which are positioned in a waiting region 7. The pick-up region 3 is further depicted in which the four transfer stations 5a, 5b, 5c and 5d are arranged, such that these transfer stations can transfer the cell stacks 115 having a pre-defined cell stack height within the pick-up region 3 to the transport vehicles 2. Each transport vehicle 2 is equipped to respectively transport a cell stack 115. FIG. 3 shows a situation in which a cell stack 115 is ready to be picked up at the transfer station 5b, such that a transport vehicle 2 is positioned below the transfer station 5b to receive the cell stack 115. For this purpose, the frontmost empty transport vehicle 2 has been moved from the waiting region 2 in the pick-up region 3 to the transfer station 5b. The empty transport vehicle 2 is called up from the waiting region 7 by to the control unit 6 if it has been detected or announced that a call stack 115 having a pre-defined cell stack height is ready. This can be implemented by a detection device (not depicted). In FIG. 3, four called-up transport vehicles 2 have correspondingly already left the waiting region 7 to pick up announced cell stacks 115 at the transfer stations 5a, 5b, 5c and 5d.

As has already been explained above in connection with FIG. 1, it can be the case that faulty segments 116 have to be removed from the production process by means of the ejection drum 124. The consequence of this is that the transfer stations 5a, 5b, 5c and 5d cannot always provide the cell stacks 115 in a pre-determined cycle. On the other hand, it is advantageous for a reliable further processing of the cell stacks 115 if the cell stacks 115 are provided in a pre-defined production cycle, and thus at pre-defined constant temporal intervals in the delivery region 4. The compensation region 11 is thus provided, in which the movement speed can be adjusted by means of the control device 6 such that the transport vehicles 2 reach the delivery region 4 in a pre-determined production cycle. This has the consequence that the transport vehicles 2 can be moved while spaced apart from one another equidistantly at a constant speed in the delivery region 4. Due to this regular and continuous movement of the transport vehicles 2 in the delivery region 4, the cell stacks 115 can be easily removed from the transport vehicle 2 with an unloading device 12, and can thus be fed to a downstream process. The empty transport vehicles 2 are then driven back into the waiting region 7 via the transport path 8b, where they are provided for a further loading in the pick-up region 3. In this exemplary embodiment, the waiting region 7 is provided ahead of the bend, via which the transport vehicles 2 are driven into the pick-up region 3. Due to the arrangement of the waiting region 7 ahead of the bend, the transport vehicles 2 can wait suspended on the rail system. If the waiting region 7 extended into the bend, the transport vehicles 2 would have to be held against gravity, which would lead to an increased energy consumption.

FIG. 3 furthermore shows a processing unit 10, which is arranged within the delivery region 4 due to the constant production cycle present there. The processing unit 10 is equipped to carry out further processing steps 10 on the cell stacks 115, for example, further material layers can be added to the cell stack 115 by the processing unit 10, such that the cell stacks 115 begin and end with the same sequence of kinds of layers, for example separator-anode.

Figure 4:
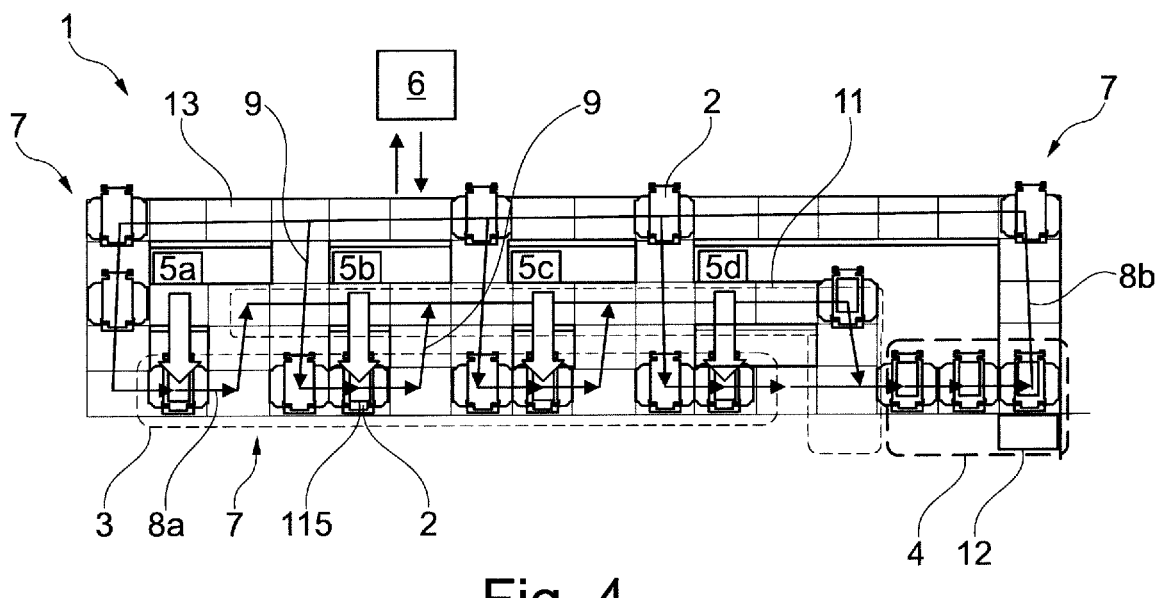
FIG. 4: shows a conveying facility according to a second embodiment.

FIG. 4 shows a second embodiment of the conveying facility 1. In the following, only the differences which result in comparison with the first embodiment according to FIG. 3 are explained in detail.

As can be seen from FIG. 4, the transport paths 8a, 8b are formed by a movement surface, which forms a plane, and is thus designed in a planar manner. The loaded transport vehicles 2 are conveyed on the transport path 8a to the delivery region 4, while the empty transport vehicles 2 are conveyed on a transport path 8b. Bypass paths 9 are further provided, which permit each of the transfer stations 5a, 5b, 5c and 5d to be reached from the waiting region 7 regardless of the occupancy of the remaining transfer stations 5a, 5b, 5c and 5d, and to be left in the direction of the delivery region 4.

In this exemplary embodiment, the waiting region 7 extends from the delivery region 4 to the transfer stations 5a, 5b, 5c and 5d. Due to the bypass paths 9, an empty transport vehicle 2 can be provided at the transfer stations Sa, 5b, Sc, 5d until the cell stack 115 is transferred. As soon as a transport vehicle 2 has been loaded with a cell stack 115, an empty transport vehicle 2 can be moved—if it is available— to the respective transfer station 5a, 5b, 5c or 5d.

The bypass paths 9 offer the further advantage that a magazine drum 110 (see FIG. 2) is not required to form the cell stack 115. The segments 116 can be directly stacked on a transport vehicle 2 to form a cell stack 115 by the removal device 111. In this embodiment, the cell stack 115 is correspondingly provided directly on the transport vehicle 2 at the transfer stations 5a, 5b, 5c and 5d.

Naturally, however, it is also possible that the cell stacking apparatus 108 having the magazine drum 110 according to FIG. 2 is used in the conveying facility 1.

The loaded transport vehicles 2 are then driven into the delivery region 4 via the compensation region 11. As previously described in connection with the exemplary embodiment from FIG. 3, the movement speed is correspondingly adjusted by means of the control device 6, such that the transport vehicles 2 loaded with cell stacks 115 are provided in the delivery region 4 in a pre-determined production cycle. In addition to controlling or regulating the movement speed, the arrival of the transport vehicles 2 can also be adjusted by controlling or regulating the movement route. Thus, for example, individual transport vehicles 2, the arrival of which in the delivery region 4 needs to be postponed, can be transported into the delivery region 4 on a longer route, for example in the form of one or more waiting loops, as an alternative or in addition to the reduction in speed.

In comparison with the exemplary embodiment with the rail system from FIG. 3, the movement surface according to the embodiment from FIG. 4 enables a higher degree of compensation. Each of the transport vehicles 2 can have its own drive unit. However, the movement surface can also be a component of a planar drive system, which is formed by standardised tiles 13, which are equipped with a magnet technology, with which the transport vehicles 2 can be correspondingly moved. The tiles 13 are then connected to the control unit 6 via signal technology.

The cell stack production system 200 according to FIG. 1 can comprise a conveying facility 1 according to the embodiment in FIG. 3 or according to the embodiment in FIG. 4. Due to the magazine drums 110 provided in FIG. 1, the cell stack 115 is transferred to the transport vehicle 2 in the finished state, and thus after the pre-defined stack height is reached.

Figure 5:
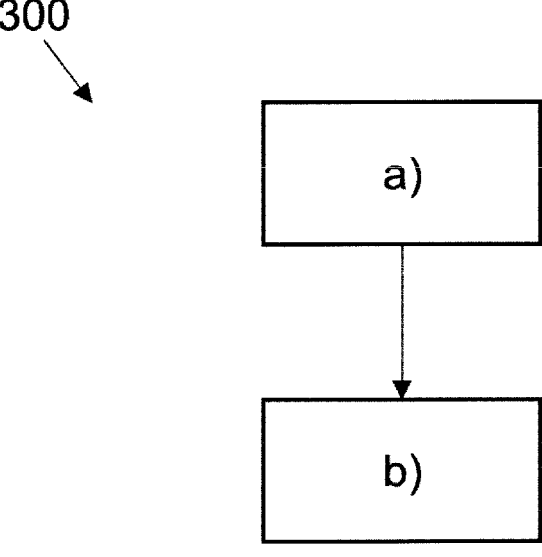
FIG. 5: shows a method for providing cell stacks formed by segments.

FIG. 5 schematically shows a method 300 for providing cell stacks 115 formed by segments 116 for the energy cell-producing industry.

In a method step a), cell stacks 115 are provided having a pre-defined cell stack height at several transfer stations 5a, 5b, 5c and 5d in the pick-up region 3, whereby segments 116 are combined to form cell stacks 115 having a pre-defined cell stack height at each of the transfer stations. The cell stacks 115 can be completed before transfer to the transport vehicle 2 or on the transport vehicle 2.

In a method step b), the cell stacks 115 are transported from the pick-up region 3 to the delivery region 4, which is spatially distanced from the pick-up region 3, by means of a plurality of transport vehicles 2, which are each equipped to transport a cell stack 115, wherein the movement speed and/or the movement route of the transport vehicles 2 loaded with the cell stacks 115 between the pick-up region 3 and the delivery region 4 is individually controlled and/or regulated.

The method 300 can for example be carried out with a cell stack production system 200 according to FIG. 1, having a conveying facility 1 according to FIG. 3, or having a conveying facility 1 according to FIG. 4.

The invention claimed is:

1. A conveying facility for conveying cell stacks formed by segments for the energy cell-producing industry, comprising several transport vehicles which can be moved individually and are each equipped to transport a cell stack, wherein a pick-up region is provided which has at least two transfer stations at which the cell stacks are provided to be picked up by the transport vehicles or at which the segments are stacked onto the transport vehicles to form cell stacks, wherein each transfer station comprises its own cell stacking apparatus, which is equipped to combine the segments into cell stacks having a pre-defined cell stack height;

a delivery region which is spatially distanced from the pick-up region is provided, in which delivery region the cell stack received in the pick-up region is removed from the transport vehicle; and a control device is provided which is equipped to individually control and/or regulate the movement speed and/or the movement route of the transport vehicles loaded with the cell stacks between the pick-up region and delivery region.

2. The conveying facility according to claim 1, wherein the control device is equipped to control and/or regulate the movement route and/or the movement speed such that a delayed completion of the cell stack at one of the transfer stations is compensated for in a compensation region between the pick-up region and the delivery region.

3. The conveying facility according to claim 1, wherein the control device is equipped to control and/or regulate the movement speed and/or the movement route such that the transport vehicles loaded with the cell stacks are provided in a pre-determined production cycle in the delivery region.

4. The conveying facility according to claim 1, wherein the control device is equipped to control and/or to regulate the transport vehicles such that they are conveyed at a constant speed in the delivery region or are moved in a defined delivery cycle.

5. The conveying facility according to claim 1, wherein a waiting region is provided, in which at least a subset of the transport vehicles are positioned in an unloaded state.

6. The conveying facility according to claim 5, wherein the control device is equipped to individually move the transport vehicles from the waiting region into the pick-up region as soon as a segment or a cell stack is ready at one of the transfer stations or a provision is announced.

7. The conveying facility according to claim 1, wherein the conveying facility comprises at least one pre-defined transport path, via which the transport vehicles can be moved between the pick-up region and the delivery region.

8. The conveying facility according to claim 7, wherein the at least one transport path is defined by a rail system on which the transport vehicles can be moved.

9. The conveying facility according to claim 7, wherein the at least one transport path is defined by a movement surface on which the transport vehicles can be moved.

10. The conveying facility according to claim 7, wherein the at least one transport path comprises at least one bypass path, via which each of the transfer stations can be reached by the transport vehicle regardless of an occupancy of a remaining transfer station by another transport vehicle and/or can be left in the direction of the delivery region.

11. The conveying facility according to claim 1, wherein a processing unit for processing the cell stacks is provided between the pick-up region and the delivery region or within the delivery region, wherein the cell stacks are fed to the processing unit by the transport vehicle.

12. A cell stack production system for producing cell stacks formed by segments for the energy cell-producing industry, wherein the cell stack production system comprises;
   a conveying facility according to claim 1 therefore, and
   a feeding facility, wherein a feeding device is provided as a component of the feeding facility, which feeding device feeds the segments such that they can be placed on top of one another by the cell stacking apparatuses of the conveying facility to form the cell stacks.

13. The cell stack production system according to claim 12, wherein the feeding facility comprises at least one rejection device, with which faulty segments can be removed from the production process.

14. A method for providing cell stacks formed by segments for the energy cell-producing industry, wherein said method comprises the following steps:
   a) providing cell stacks having a pre-defined cell stack height at several transfer stations in a pick-up region, wherein segments are combined to form cell stacks having a pre-defined cell stack height at each of the transfer stations; and

16 b) transporting the cell stack from the pick-up region to a delivery region which is spatially distanced from the pick-up region by means of a plurality of transport vehicles, which are each equipped to transport a cell stack, wherein the movement speed and/or the movement route of the transport vehicles loaded with the cell stacks between the pick-up region and the delivery region is individually controlled and/or regulated.

15. The method according to claim 14, wherein the method is carried out by means of:
   A) a conveying facility for conveying cell stacks formed by segments for the energy cell-producing industry, comprising several transport vehicles which can be moved individually and are each equipped to transport a cell stack, wherein
      a pick-up region is provided which has at least two transfer stations at which the cell stacks are provided to be picked up by the transport vehicles or at which the segments are stacked onto the transport vehicles to form cell stacks, wherein each transfer station comprises its own cell stacking apparatus, which is equipped to combine the segments into cell stacks having a pre-defined cell stack height;
      a delivery region which is spatially distanced from the pick-up region is provided, in which delivery region the cell stack received in the pick-up region is removed from the transport vehicle; and
      a control device is provided which is equipped to individually control and/or regulate the movement speed and/or the movement route of the transport vehicles loaded with the cell stacks between the pick-up region and delivery region; or
   B) a cell stack production system for producing cell stacks formed by segments for the energy cell-producing industry, wherein the cell stack production system comprises:
      a conveying facility comprising several transport vehicles which can be moved individually and are each equipped to transport a cell stack, wherein
      a pick-up region is provided which has at least two transfer stations at which the cell stacks are provided to be picked up by the transport vehicles or at which the segments are stacked onto the transport vehicles to form cell stacks, wherein each transfer station comprises its own cell stacking apparatus, which is equipped to combine the segments into the segments into cell stacks having a pre-defined cell stack height;
      a delivery region which is spatially distanced from the pick-up region is provided, in which delivery region the cell stack received in the pick-up region is removed from the transport vehicle; and
      a control device is provided which is equipped to individually control and/or regulate the movement speed and/or the movement route of the transport vehicles loaded with the cell stacks between the pick-up region and delivery region; and
      a feeding facility, wherein a feeding device is provided as a component of the feeding facility, which feeding device feeds the segments such that they can be placed on top of one another by the cell stacking apparatuses of the conveying facility to form the cell stacks.

* * * * *